B. D. WHITNEY.
Saw-Mill Head-Block.

No. 199,386. Patented Jan. 22, 1878.

WITNESSES:
Chas. Kimball
Charles E. Clifford

INVENTOR:
B. Dexter Whitney
Per atty
Wm Henry Clifford

UNITED STATES PATENT OFFICE.

B. DEXTER WHITNEY, OF GARDINER, MAINE.

IMPROVEMENT IN SAW-MILL HEAD-BLOCKS.

Specification forming part of Letters Patent No. 199,386, dated January 22, 1878; application filed November 20, 1877.

*To all whom it may concern:*

Be it known that I, B. DEXTER WHITNEY, of Gardiner, in the State of Maine, have invented certain new and useful Improvements in Saw-Mills; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
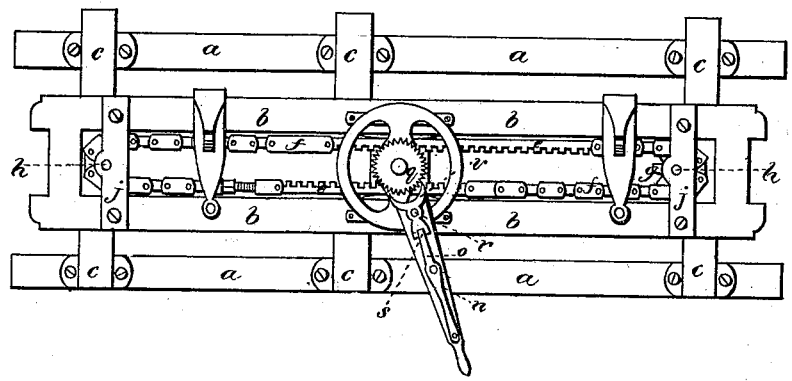
Figure 2:
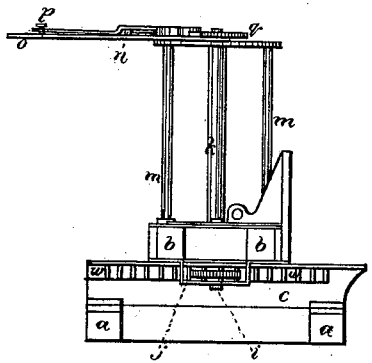
Figure 4:
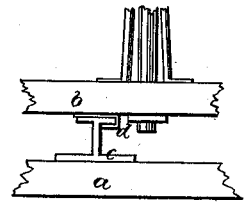
Figure 3:
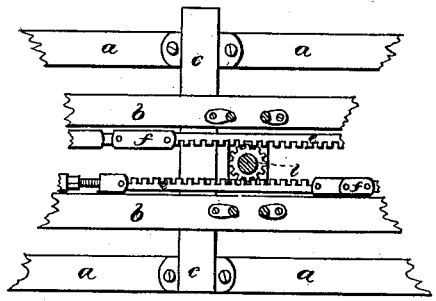

Figure 1 is a top plan. Fig. 2 is an end view. Fig. 3 is a top section. Fig. 4 is a detail to show the tracks.

Same letters show like parts.

The object of my invention is to provide a machine for setting logs for sawing. The devices are to operate in such way as to move up the lumber after each board or piece is cut off, so that another of the desired thickness can be removed.

$a$ is the bottom frame, which moves to present the log to the saw. $b$ is the top frame, carrying my improvements. The bottom frame is furnished with the tracks $c$, bolted to it and across it. $d$ are slides attached to the under side of $b$, to move on the tracks $c$. The log rests on the tracks $c$. It is pushed along on these tracks as boards or pieces are sawed off in a direction across the frame $a$, and with the tracks $c$.

It remains to describe how this operation, in which my invention consists, is effected. Within the frame $b$ are the moving racks $e$ and belts $f$, moving horizontally within the frame. The belts are so made as to have spaces to fit over the teeth of the wheels $g$, rigidly set on upright short shafts $h$, which shafts have, at their lower ends, rigidly attached, the pinions $i$. The shafts $h$ have bearings $j$. $k$ is an upright lever-shaft, with a pinion, $l$, at the lower end, working into the moving racks $e$, and by which they are moved with the belts $f$, &c. This shaft $k$ is supported by a frame, $m$, rising from the frame $b$. $n$ is a pawl on the top end of $k$, set on an arm, $o$, projecting horizontally out from $k$. This pawl has a catch, $p$, to hold it when disengaged from the ratchet $q$, rigidly set on the top end of $k$. The pawl is pivoted at $r$, and has a joint at $s$, formed by the end of one part working into a notch in the end of the other part, as illustrated. Working into this slot or notch is a spring, whose tendency is to keep the bifurcations $v$ of the pawl disengaged from the ratchet $q$, and which will throw them out of the ratchet when the force of the leverage of $n$ is taken away. By turning the arm in one direction one of the bifurcations $v$ will engage into the ratchet $q$, and then, by moving the arm $o$ backward and forward, the frame $b$ is caused to slide in one direction. When the other bifurcation $v$ is engaged the opposite movement of $b$ is the result. This motion of the frame $b$ is immediately produced by the pinions $i$ working in the racks $w$ on the sides of two of the tracks $c$. Thus a movement in either direction of the frame $b$ is obtained, and such movements of the lumber or log sidewise can be given as are necessary.

It will be, of course, understood that the log or lumber is properly held or dogged to the upper moving frame $b$.

What I claim as my invention, and desire to secure by Letters Patent, is—

The combination, with the two frames $a$ and $b$, of the tracks $c$, slides $d$, moving racks $e$, belts $f$, wheels $g$, and shafts, pinions $i$, racks $w$, upright shaft $k$, pawl $n$, with parts $o\ r\ s\ v\ t\ u\ p$, ratchet $q$, and pinion $l$, as herein described.

In testimony that I claim the foregoing as my own I affix my signature in presence of two witnesses.

B. DEXTER WHITNEY.

Witnesses:
WM. S. BROWN,
G. W. COLBURN.